(12) United States Patent
Hur et al.

(10) Patent No.: US 9,087,470 B2
(45) Date of Patent: Jul. 21, 2015

(54) 3D IMAGE DISPLAY APPARATUS AND DRIVING METHOD THEREOF

(75) Inventors: Gil-tae Hur, Suwon-si (KR); Kun-ho Cho, Suwon-si (KR); Yong-hun Kwon, Anyang-si (KR); Kye-hoon Lee, Suwon-si (KR); Suk-ju Choi, Jeonju-si (KR); Young-min Lee, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 13/243,608

(22) Filed: Sep. 23, 2011

(65) Prior Publication Data

US 2012/0154463 A1 Jun. 21, 2012

(30) Foreign Application Priority Data

Dec. 20, 2010 (KR) .......................... 10-2010-0130980

(51) Int. Cl.
*G09G 5/10* (2006.01)
*G09G 3/00* (2006.01)
*G02B 27/22* (2006.01)
(Continued)

(52) U.S. Cl.
CPC .............. *G09G 3/003* (2013.01); *G02B 27/225* (2013.01); *G02B 27/2214* (2013.01); *G02B 27/2264* (2013.01); *G09G 3/3611* (2013.01); *H04N 13/0418* (2013.01); *H04N 13/0468* (2013.01); *G09G 3/342* (2013.01); *G09G 2300/023* (2013.01); *G09G 2310/0237* (2013.01); *G09G 2320/0261* (2013.01);
(Continued)

(58) Field of Classification Search
CPC .................. B60K 15/0406; B60K 2015/0344; B60K 2015/03547; B60K 2015/0451; B60Y 2200/225; F02M 25/0854; F02M 37/20; G02B 27/2214; G02B 27/225; G02B 27/2264; H04N 13/00
USPC .................................................. 345/173–184
See application file for complete search history.

(56) References Cited

U.S. PATENT DOCUMENTS 5,969,850 A 10/1999 Harrold et al.
6,088,052 A * 7/2000 Guralnick ....................... 348/51
(Continued)

FOREIGN PATENT DOCUMENTS

CN 101729917 A 6/2010
JP 2007-164116 A 6/2007

OTHER PUBLICATIONS

Communication dated Feb. 24, 2012 issued by the European Patent Office in counterpart European Application No. 11190579.0.
(Continued)

*Primary Examiner* — Yong H Sim
*Assistant Examiner* — Chun-Nan Lin
(74) *Attorney, Agent, or Firm* — Sughrue Mion, PLLC (57) ABSTRACT

A 3D image display apparatus includes a first display panel which alternately displays a left eye image and a right eye image, a second display panel having a plurality of pixels including a left eye pixel and a right eye pixel, a backlight unit which is disposed at a back side of the second display panel, a lens array which is disposed at a front side of the second display panel and has a plurality of lenticular lenses dividing light emitted from the backlight unit into a left eye visual field and a right eye visual field and emitting the divided light, and a control unit which controls on and off of the left eye pixel and the right eye pixel of the second display panel according to a time when the left eye image and the right eye image are displayed.

12 Claims, 9 Drawing Sheets

(51) Int. Cl.
*G09G 3/36* (2006.01)
*H04N 13/04* (2006.01)
*G09G 3/34* (2006.01)

(52) U.S. Cl.
CPC ..... *G09G 2320/068* (2013.01); *H04N 13/0404* (2013.01); *H04N 2213/008* (2013.01)

(56) References Cited

U.S. PATENT DOCUMENTS

| | | | |
|---|---|---|---|
| 7,969,463 B2* | 6/2011 | Takaki | 348/59 |
| 8,029,139 B2* | 10/2011 | Ellinger et al. | 353/7 |
| 8,149,342 B2* | 4/2012 | Ijzerman et al. | 349/15 |
| 8,294,753 B2 | 10/2012 | Jeong et al. | |
| 8,373,684 B2* | 2/2013 | Kim et al. | 345/204 |
| 2008/0036853 A1* | 2/2008 | Shestak et al. | 348/51 |
| 2008/0088753 A1* | 4/2008 | Chestak et al. | 349/15 |
| 2008/0316380 A1* | 12/2008 | Ijzerman et al. | 349/15 |
| 2009/0190095 A1* | 7/2009 | Ellinger et al. | 353/7 |
| 2009/0201362 A1* | 8/2009 | Shestak et al. | 348/56 |
| 2009/0322862 A1* | 12/2009 | Vissenberg et al. | 348/59 |
| 2010/0097449 A1* | 4/2010 | Jeong et al. | 348/59 |
| 2010/0165085 A1* | 7/2010 | MacNaughton et al. | 348/56 |
| 2011/0157260 A1* | 6/2011 | Pyun et al. | 345/691 |
| 2011/0273440 A1* | 11/2011 | Park et al. | 345/419 |
| 2011/0273480 A1* | 11/2011 | Park et al. | 345/690 |
| 2011/0285761 A1* | 11/2011 | Yu | 345/691 |
| 2012/0004919 A1* | 1/2012 | Muth | 704/500 |
| 2012/0013601 A1* | 1/2012 | Park et al. | 345/419 |
| 2012/0092450 A1* | 4/2012 | Choi et al. | 348/43 |
| 2012/0147157 A1* | 6/2012 | Wu et al. | 348/56 |
| 2015/0009307 A1* | 1/2015 | Lee et al. | 348/54 |

OTHER PUBLICATIONS

Communication, Issued by the State Intellectual Property Office of P.R. China, Dated Oct. 27, 2014, in counterpart Chinese Application No. 201110428497.3.

* cited by examiner

3D IMAGE DISPLAY APPARATUS AND DRIVING METHOD THEREOF

CROSS-REFERENCE TO RELATED APPLICATIONS

This application claims priority from Korean Patent Application No. 10-2010-0130980, filed in the Korean Intellectual Property Office on Dec. 20, 2010, the disclosure of which is incorporated herein in its entirety by reference.

BACKGROUND

1. Field of the Invention

Aspects of the exemplary embodiments relate to a three-dimensional (3D) image display apparatus and a driving method thereof, and more particularly, to an auto-stereoscopic 3D image display apparatus and a driving method thereof.

2. Description of the Related Art

With the development of technologies, an image display apparatus capable of displaying a more vivid image is required. Accordingly, not only a high-resolution image display apparatus having the increased number of pixels for displaying an image but also a 3D image display apparatus displaying a stereoscopic image have been developed. Such a 3D image display apparatus may be applicable not only to television but also to various fields such as medical imaging, games, commercials, education, and military where a stereoscopic sense can be used very effectively.

A stereoscopic image is generally created by a principal of stereo visual angle of human eyes, and binocular parallax, caused by about a 65 mm lateral distance between a person's left eye and right eye, can be regarded as the main cause of the stereoscopic sense. Therefore, if an image which is the same as an actual image is input to the two eyes, a stereoscopic sense may be realized easily. For example, if two cameras having the same properties are placed spaced apart just like the two eyes and a left eye image photographed from a left camera can be perceived only by the left eye and a right eye image photographed from a right camera can be perceived only by the right eye, a stereoscopic sense may be realized.

Such a 3D image display apparatus using binocular parallax may be divided into two types: a 3D image display apparatus using an auto-stereoscopic method, and a 3D image display apparatus using a stereoscopic method. The auto-stereoscopic method which obtains a stereoscopic image by separating a left eye image and a right eye image without using glasses may include a parallax barrier method, a lenticular method, an integral imaging method and a holography method. The auto-stereoscopic method may include a polarized-glasses method and a shutter-glasses method.

Figure 1A:
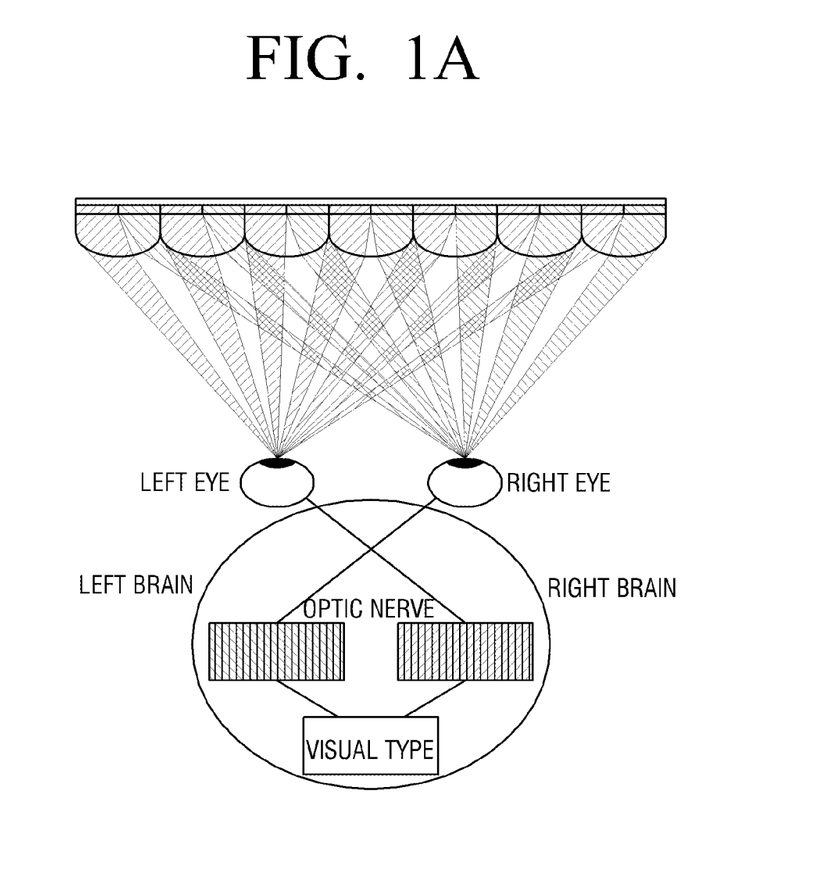
FIGS. 1A and 1B are views for explaining a prior art technology.
Figure 1B:
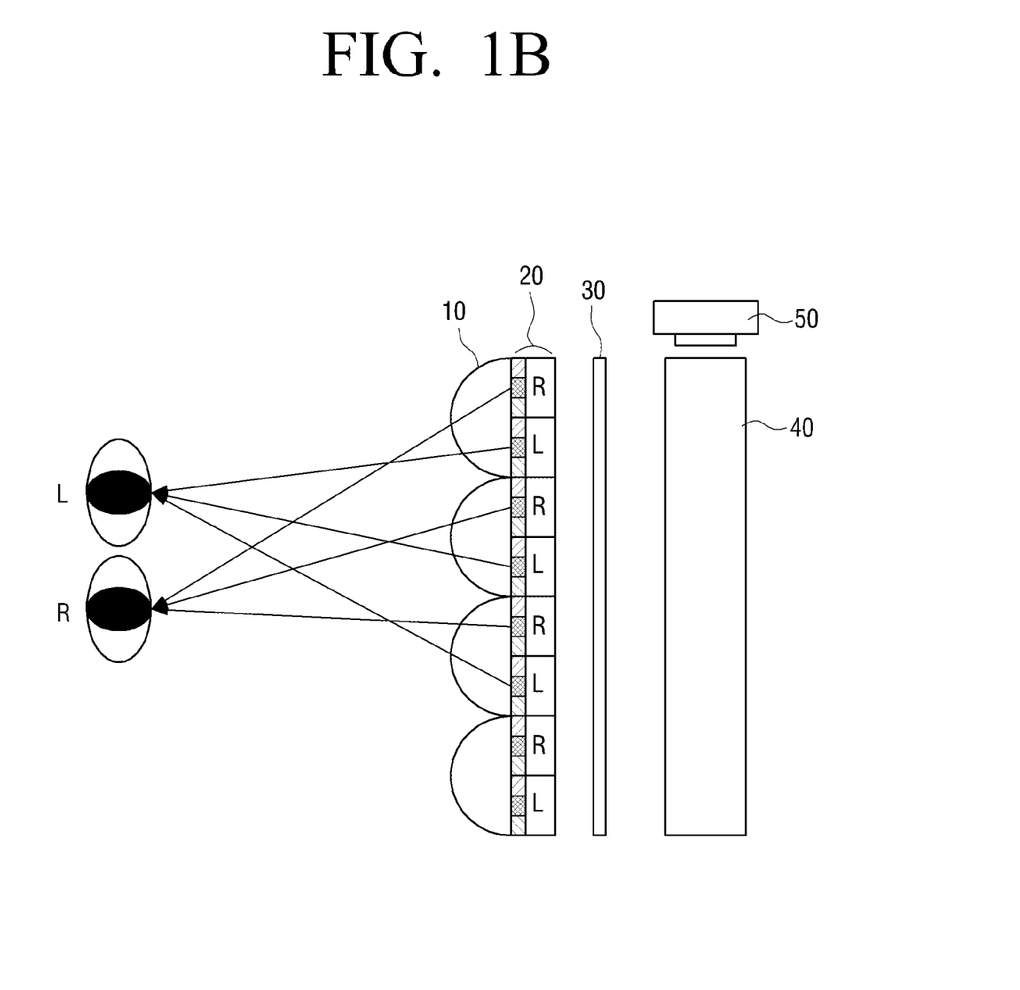

FIGS. 1A and 1B are views for explaining prior art technologies.

According to FIGS. 1A and 1B, an auto-stereoscopic display apparatus according to the prior art lenticular method realizes a 3D image by causing a left eye and a right eye to perceive a different image using a space-division method.

That is, the prior art auto-stereoscopic display apparatus realizes images perceived by the left eye and the right eye separately, and refracts each image to have a specific angle using a lenticular lens so that the left eye image can be focused onto the left eye and the right eye image can be focused onto the right eye, thereby realizing a 3D image.

However, as an auto-stereoscopic 3D panel using the prior art lenticular lens realizes a left eye image and a right eye image separately, resolution of the images decreases by half.

In addition, a portion where a lenticular image is focused is fixed and thus, a user may perceive a 3D image only at a specific location and angle.

Furthermore, the auto-stereoscopic 3D panel using the prior art lenticular lens refracts an image using a lenticular lens and thus, image quality may deteriorate if a 2D image is realized.

SUMMARY

One or more exemplary embodiments provide a 3D image display apparatus having a plurality of display panels and a driving method thereof.

According to an aspect of an exemplary embodiment, there is provided a 3D image display apparatus. The 3D image display apparatus may include a first display panel which alternately displays a left eye image and a right eye image, a second display panel having a plurality of pixels including a left eye pixel and a right eye pixel, a backlight unit which is disposed at a back side of the second display panel, a lens array which is disposed at a front side of the second display panel and includes a plurality of lenticular lenses dividing light emitted from the backlight unit into a left eye visual field and a right eye visual field and emitting the divided light, and a control unit which controls turning on and off of the left eye pixel and the right eye pixel of the second display panel according to a time when the left eye image and the right eye image are displayed.

The control unit may realize a 3D image by controlling the left eye pixel and the right eye pixel to be turned on and off alternately so that light emitted from the backlight unit is provided to the lens array when the left eye pixel or the right eye pixel is turned on.

The control unit may realize a 2D image by controlling the left eye pixel and the right eye pixel to be turned on and off simultaneously so that light emitted from the backlight unit is provided to the lens array when the left eye pixel and the right eye pixel are turned on.

The first display panel may be embodied as a color liquid crystal, and the second display panel may be a black and white liquid crystal.

The control unit may control turning on and off of the left eye pixel and the right eye pixel of the second display panel according to a sync signal corresponding to the left eye image and the right eye image provided from the first display panel.

The apparatus may further include a sensing unit which senses a user's location, and the control unit may change the left eye pixel and the right eye pixel according to the user's location.

The apparatus may further include at least one of a first optical film which is disposed in a back side direction of the second display panel and a second optical film disposed in a front side direction of the second display panel.

According to another aspect of an exemplary embodiment, there is provided a method for driving a 3D image display apparatus including a first display panel, a second display panel having a plurality of pixels including a left eye pixel and a right eye pixel, a backlight unit which is disposed at a back side of the second display panel, a lens array which is disposed at a front side of the second display panel and includes a plurality of lenticular lenses dividing light emitted from the backlight unit into a left eye visual field and a right eye visual field and emitting the divided light. The method for driving a 3D image display apparatus may include alternately displaying a left eye image and a right eye image; and controlling turning on and off of the left eye pixel and the right eye pixel of the second display panel according to a time when the left eye image and the right eye image are displayed.

The controlling may include realizing a 3D image by controlling the left eye pixel and the right eye pixel to be turned on and off alternately so that light emitted from the backlight unit is provided to the lens array when the left eye pixel or the right eye pixel is turned on.

The controlling may include realizing a 2D image by controlling the left eye pixel and the right eye pixel to be turned on and off simultaneously so that light emitted from the backlight unit is provided to the lens array when the left eye pixel and the right eye pixel are turned on.

The first display panel may be a color liquid crystal and the second display panel may be a black and white liquid crystal.

The controlling may include controlling turning on and off of the left eye pixel and the right eye pixel of the second display panel according to a sync signal corresponding to the left eye image and the right eye image provided from the first display panel.

The method may further include sensing a user's location and changing the left eye pixel and the right eye pixel according to the user's location.

The method may further include displaying with the 3D image display apparatus which may further include at least one of a first optical film which is disposed in a back side direction of the second display panel and a second optical film disposed in a front side direction of the second display panel.

Accordingly, an image may be realized according to a time sharing 3D method similar to a shutter glasses method, and thus resolution may be maintained even in an auto-stereoscopic 3D method.

BRIEF DESCRIPTION OF THE DRAWINGS

The above and/or other aspects of the present inventive concept will be more apparent by describing certain exemplary embodiments with reference to the accompanying drawings, in which.

DETAILED DESCRIPTION

Hereinafter, the present inventive concept will be described more fully with reference to the accompanying drawings, in which one or more exemplary embodiments are described in greater detail.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 2:
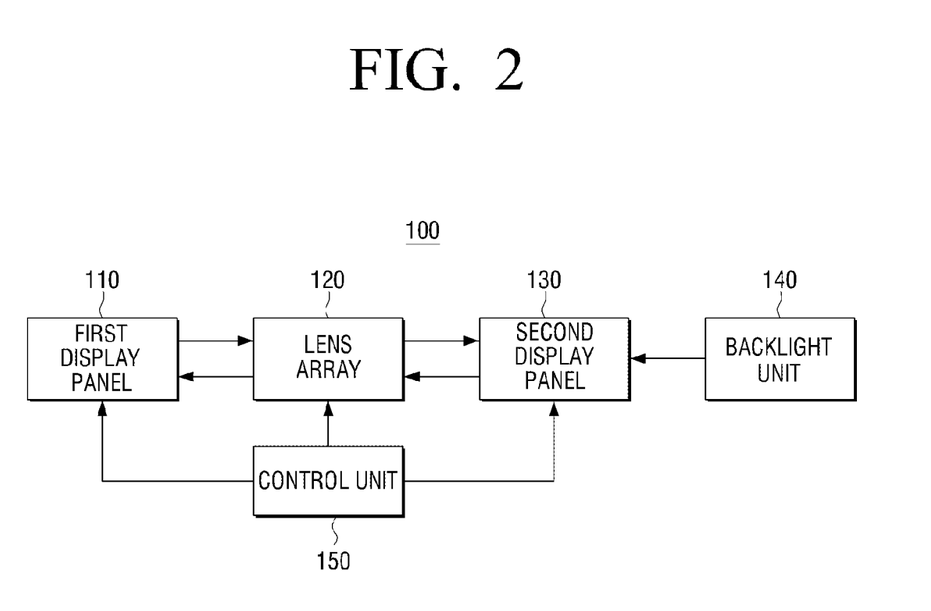
FIG. 2 is a block diagram illustrating a configuration of a 3D image display apparatus according to an exemplary embodiment.

FIG. 2 is a block diagram illustrating a configuration of a 3D image display apparatus according to an exemplary embodiment.

Referring to FIG. 2, the 3D image display apparatus 100 includes a first display panel 110, a lens array 120, a second display panel 130, a backlight unit 140, and a control unit 150.

The first display panel 110 may display a left eye image and a right eye image alternately. The first display panel 110 may be embodied using various color liquid crystals. For example, the first display panel 110 may be embodied using a color liquid crystal display (LCD). The LCD is a display apparatus which displays an image using the properties of a liquid crystal of which molecular arrangement changes if voltage is applied, and displays a text or an image using optical refraction change occurring when a liquid crystal is injected into a narrow space between two glasses and electrical pressure is applied through a transparent electrode to change the molecular arrangement of each liquid. The detailed description regarding the first display panel 110 will not be provided.

The second display panel 130 consists of a plurality of pixels, and the plurality of pixels may include a left eye pixel and a right eye pixel. The second display panel 130 may be embodied using various black and white liquid crystals. For example, the second display panel 130 may be embodied using a black and white LCD.

The lens array 120 is disposed at the front side of the second display panel 130 and may include a plurality of lenticular lenses which emit light emitted from the backlight unit 140, 160 by dividing the light into a left eye visual field and a right eye visual field.

The backlight unit 140, 160 is disposed at the back side of the second display panel 130 and may provide light to the second display panel 130. The backlight unit 140, 160 may include a light source such as a Cold Cathode Fluorescent Lamp (CCFL) and a light emitting diode (LED), and various optical films, for example but not limited to diffuser, prism, Dual Brightness Enhancement Film (DBEF), and so on.

The control unit 150 may control on and off of a left eye pixel and a right eye pixel constituting the second display panel 130 according to a time when a left eye image and a right eye image are displayed.

In addition, the control unit 150 may realize a 3D image by controlling a left eye pixel and a right eye pixel constituting the second display panel 130 to be turned on and off alternately so that light emitted from the backlight unit 140 may be provided to the lens array 120 when the left eye pixel or the right eye pixel is turned on.

The control unit 150 may also realize a 2D image by controlling a left eye pixel and a right eye pixel constituting the second display panel 130 to be turned on and off simultaneously so that light emitted from the backlight unit 140 may be provided to the lens array 120 when the left eye pixel and the right eye pixel are turned on.

In addition, the control unit 150 may control on and off of a left eye pixel and a right eye pixel constituting the second display panel 130 according to a sync signal corresponding to a left eye image and a right eye image provided from the first display panel 110.

Although not illustrated in the drawing, the 3D image display apparatus according to another exemplary embodiment may further include a sensing unit (not shown) for sensing a location of a user.

In this case, the control unit 150 may change a left eye pixel and a right eye pixel constituting the second display panel 130 according to a location of a user sensed by the sensing unit (not shown). Specifically, a location of a pixel in charge of a left eye pixel which is turned on when a left eye image is displayed and a right eye pixel which is turned on when a right eye image is displayed may be changed according to a location of the left eye and the right eye of a user. This will be explained in detail with reference to FIGS. 5A and 5B.

Figure 3:
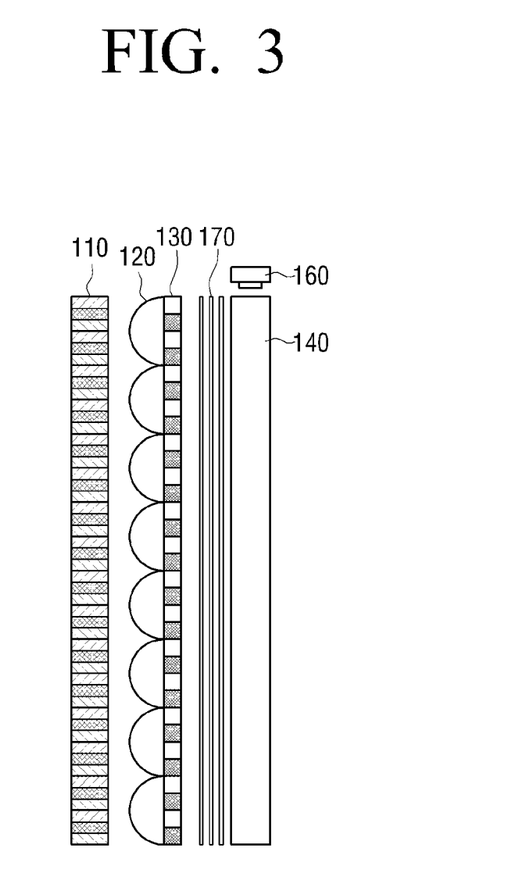
FIG. 3 is a view illustrating a structure of a 3D image display apparatus according to an exemplary embodiment.

FIG. 3 is a view illustrating a structure of a 3D image display apparatus according to an exemplary embodiment.

Referring to FIG. 3, a 3D image display apparatus comprises the first display panel 110, the lens array 120, the second display panel 130, a backlight unit 140, 160, and a first optical film 170.

The first display panel 110 may display a left eye image and a right eye image alternately. Herein, the first display panel 110 may be embodied using various color liquid crystals such as a color LCD.

The lens array 120 may be provided on a back side of the first display panel 110.

The lens array 120 is disposed between the first display panel 110 and the second display panel 130, that is, on the back side of the first display panel 110 and the front side of the second display panel 130, and may comprise a plurality of lenticular lenses which emit light emitted from the backlight unit 140 by dividing the light into a left eye visual field and a right eye visual field.

The lens array 120 which represents hemispheric lenses arranged in 'y' direction, that is, in a direction perpendicular to a line connecting two eyes of a user, is disposed between the back side of the first display panel 110 and the second display panel 130 so that light for a left visual field may face the left visual field and light for a right visual field may face the right visual filed. The arrangement interval and refraction of hemispheric lenses may be easily designed by those skilled in the related art by referring to a viewing distance of a user and distances of the first display panel 110, the second display panel 130 and the backlight unit 140, 160, and thus detailed description will not be provided.

The second display panel 130 comprises a plurality of pixels, and the plurality of pixels may include a left eye pixel and a right eye pixel. Herein, the second display panel 130 may be embodied as various black and white liquid crystals, specifically, black and white LCD.

In this case, each of a plurality of lenticular lenses constituting the lens array 120 may be disposed to correspond to each of a predetermined number of pixel group units from among a plurality of pixels constituting the second display panel 130.

The backlight unit 140, 160 is disposed at the back side of the second display panel 130 and may provide light to the second display panel 130.

The backlight unit 140, 160 may comprise a light guide plate 140 and a light source 160.

The light guide plate 140 receives light emitted from the light source 160 and disperses the light onto an entire upper surface of the light guide plate 140. In some cases, a reflective layer (not shown) is fixed on a lower surface of the light guide plate 140 so that light can be guided only to the upper surface of the light guide plate 140.

The light source 160 provides light to the light guide plate 140 and may be embodied as a plurality of Light Emitting Diodes (LEDs). The LED is an element which emits light using a light emitting phenomenon (electroluminescence) occurring when voltage is applied to a semiconductor. The materials suitable for LED may be materials of which light emitting wavelength exists in visible or near infrared region, of which light emitting efficiency is high, and which is capable of p-n junction.

Such materials may include compound semiconductors such as GaN, GaAs, GaP, GaAsl-x Px, Gal-xAlxAs, InP, and Inl-xGaxP.

On/off of the left eye pixel and the right eye pixel of the second display panel 130 may be adjusted according to a time when a left eye image and a right eye image are displayed in the first display panel 110.

The optical film 160 reflects light reflected from the backlight unit 140, 160, preventing brightness from being deteriorated.

Various optical films such as diffuser, prism, and DBEF, especially DBEF may be used for the optical film 170.

Although not illustrated in the drawing, a sensing unit (not shown) for sensing a location of a user may be further included, and a left eye pixel and a right eye pixel constituting the second display panel 130 may be changed according to a location of a user sensed by the sensing unit (not shown). Specifically, a location of a pixel in charge of a left eye pixel which is turned on when a left eye image is displayed and a right eye pixel which is turned on when a right eye image is displayed may be changed according to a location of the left eye and the right eye of a user.

As described above, an LED may be used as the light source 160. However, in some cases, CCFL and External Electrode Fluorescent Lamp (EEFL) may be used as a light source.

Figure 4A:
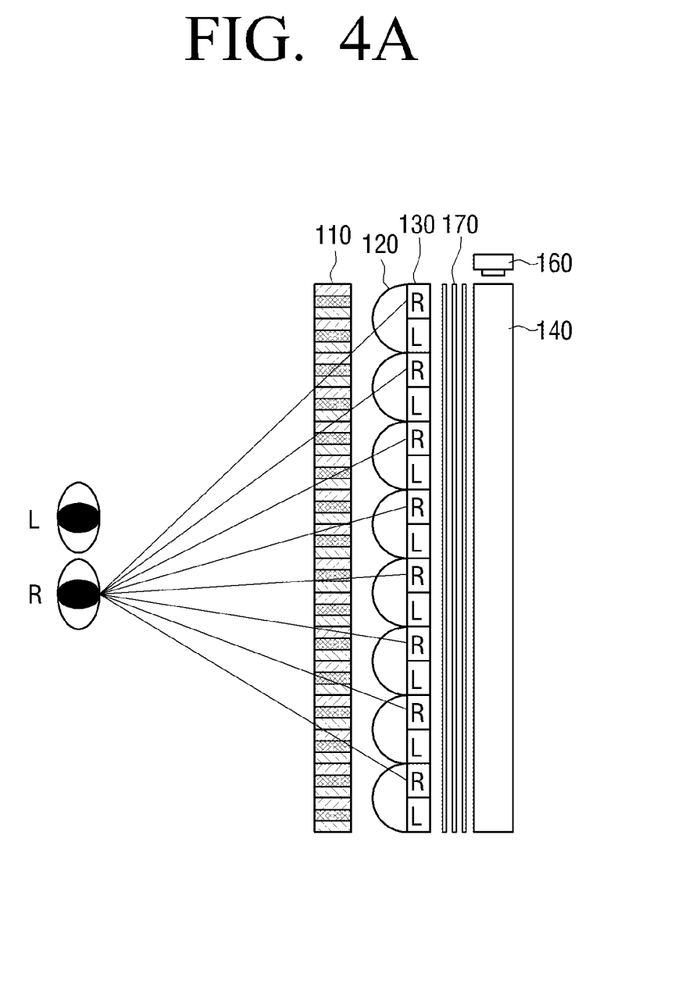
FIGS. 4A and 4B are views for explaining operation of a 3D image display apparatus according to an exemplary embodiment.
Figure 4B:
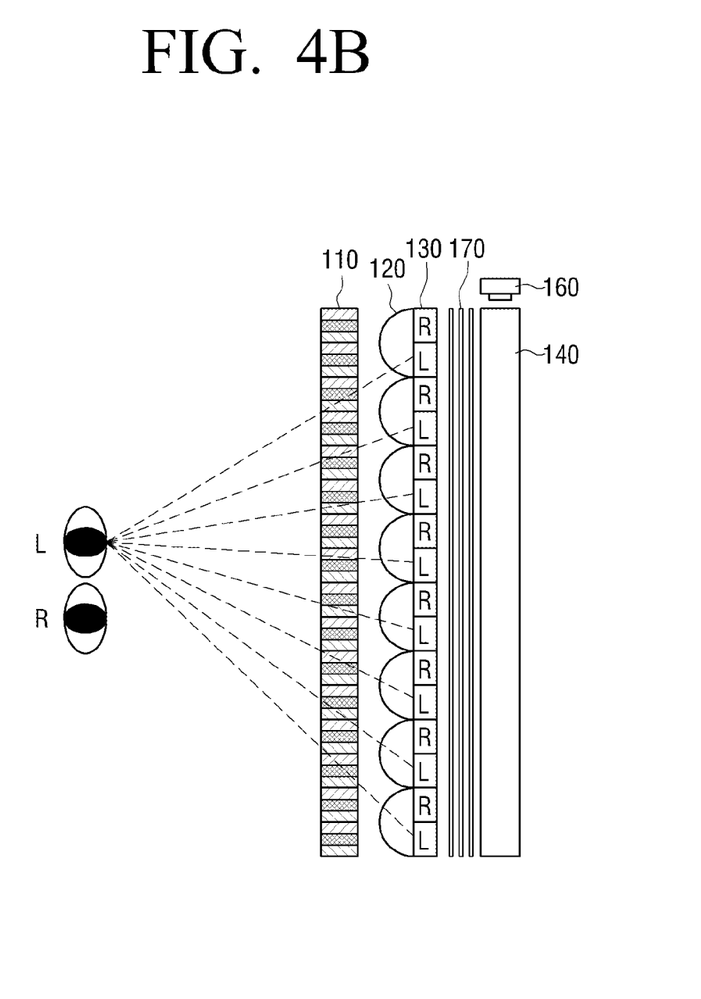

FIGS. 4A and 4B are views for explaining a method for driving a 3D image display apparatus according to an exemplary embodiment.

Referring to FIGS. 4A and 4B, in a 3D mode, a 3D image is realized according to a time-sharing method using the first display panel 110, and each image is perceived by the left eye and the right eye through a BLU using the second display panel 130 and the lens array 120 which are synchronized with time-sharing of an image. The first display panel 110 may be embodied as a color LCD and the second display panel 130 may be embodied as a black and white LCD. In addition, the lens array 120 may be embodied as a plurality of lenticular lenses. The lens array 120 may be embodied to correspond to each of a predetermined number of pixel units from among a plurality of pixels constituting the second display panel 130.

That is, as illustrated in FIGS. 4A and 4B, the first display panel 110 continues to reproduce a left eye image and a right eye image alternately, and a plurality of pixels constituting the second display panel 130 are synchronized with a time when a left eye image and a right eye image are displayed and turned on alternately, thereby realizing a 3D image.

As illustrated in FIG. 4A, if a right eye image is displayed in the first display panel 110, a pixel (R) in charge of a right eye image is turned on in the second display panel 130, and light passing through the pixel forms an image on the right eye (R) of a user by the lens 120 designed to face the right eye.

As illustrated in FIG. 4B, if a left eye image is displayed in the first display panel 11, a pixel (L) in charge of a left eye image is turned on in the second display panel 130, and light passing through the pixel forms an image on the left eye (L) of a user by the lens 120 designed to face the left eye.

That is, the second display panel 130 and the front lens 120 perform a function previously performed by 3D glasses in a conventional shutter glasses method.

Meanwhile, in a 2D mode, all pixels constituting the second display panel 130 are turned on, serving as a backlight unit (BLU) in a conventional LCD panel. Accordingly, image quality is not deteriorated even in a 2D mode.

Figure 5A:
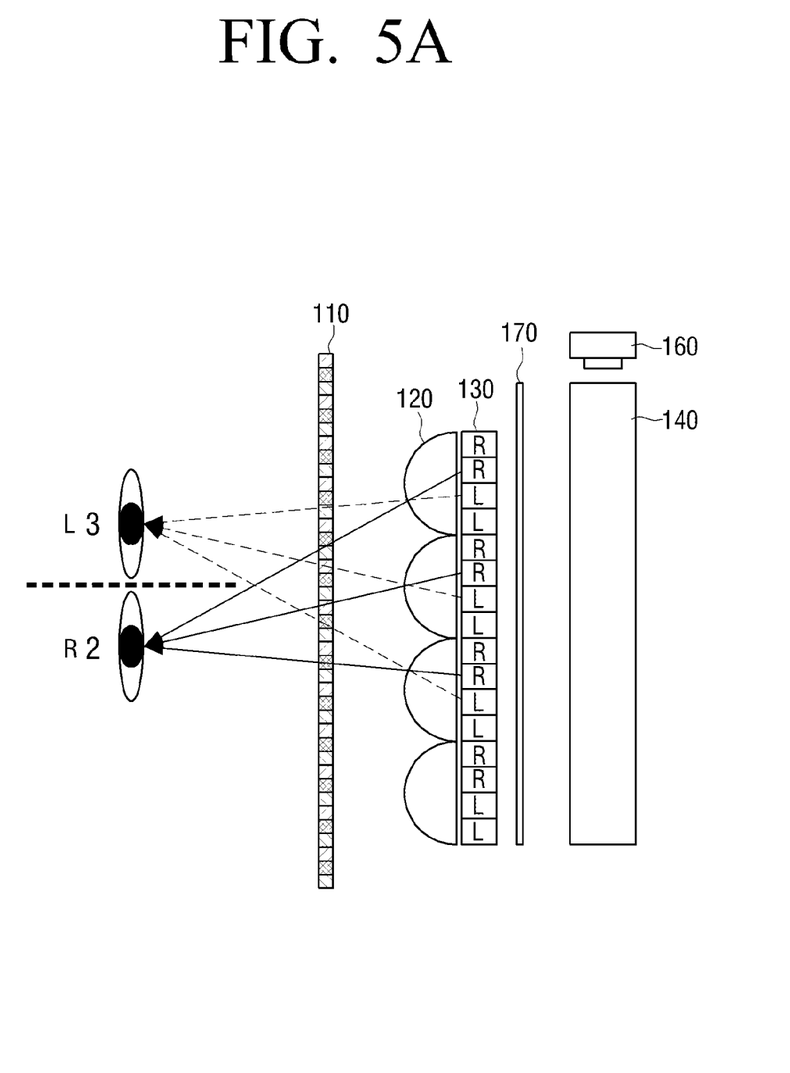
FIGS. 5A and 5B are views for explaining operation of a 3D image display apparatus according to another exemplary embodiment.
Figure 5B:
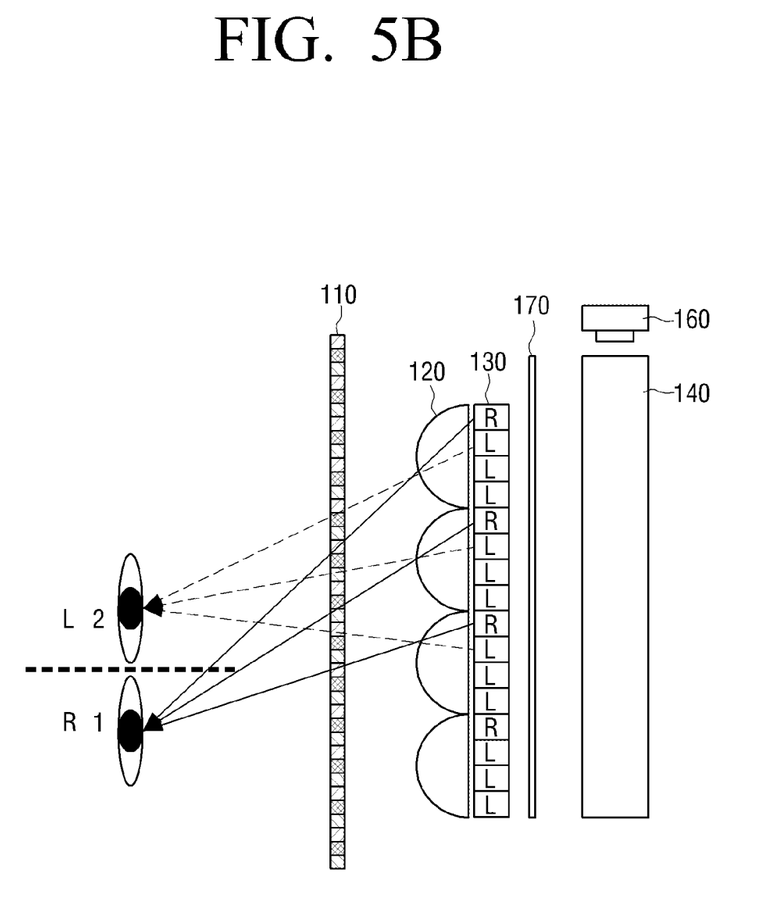

FIGS. 5A and 5B are views for explaining a method for operating a 3D image display apparatus according to another exemplary embodiment.

Referring to FIGS. 5A and 5B, on and off of a pixel constituting the second display panel 130 may be controlled according to a location of a user (that is, a viewer) so that the user may watch a 3D image at any location. In this case, the location of the user may be sensed by a sensor provided in a 3D image display apparatus.

That is, if a user's location is changed as illustrated in FIGS. 5A and 5B, a left eye pixel and a right eye pixel constituting the second display panel 130 are changed so that the user may watch the same 3D image even in a changed location.

As illustrated in FIG. 5A, if a user's right eye and left eye are in '2' and '3' respectively, the second and the third pixels out of four pixels corresponding to each lenticular lens from among a plurality of pixels constituting the second display panel 130 may be in charge of a right eye pixel and a left eye pixel which cause an image to be formed in the right eye and the left eye respectively.

As illustrated in FIG. 5B, if a user's right eye and left eye are in '1' and '2' respectively, pixels responsible for a right eye pixel and a left eye pixel may be changed so that the first and the second pixels out of four pixels corresponding to each lenticular lens from among a plurality of pixels constituting the second display panel 130 may be in charge of the right eye pixel and the left eye pixel which cause an image to be formed in the right eye and the left eye respectively.

Accordingly, even if a user's location is changed, the user may watch the same 3D image.

Figure 6:
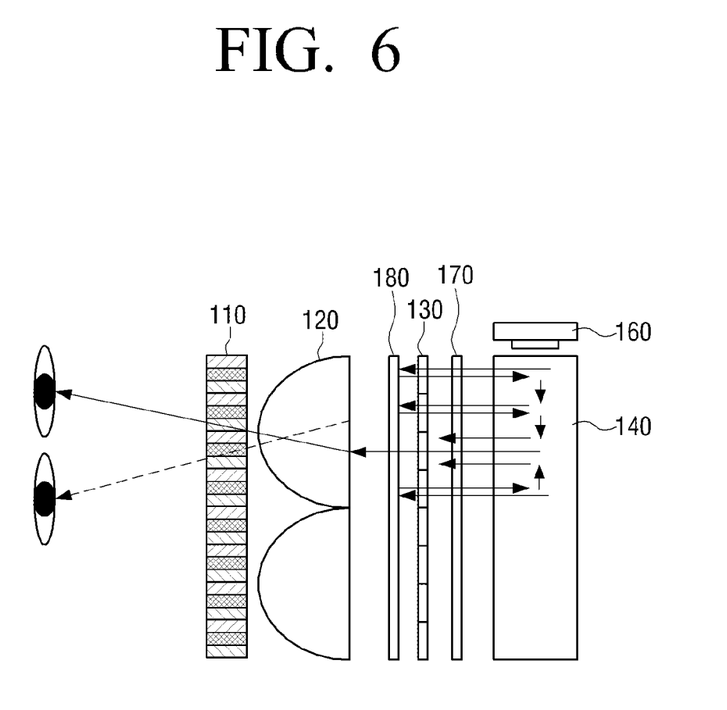
FIG. 6 is a view illustrating a structure of a 3D image display apparatus according to another exemplary embodiment.

FIG. 6 is a view illustrating a structure of a 3D image display apparatus according to another exemplary embodiment.

Referring to FIG. 6, a 3D image display apparatus comprises the first display panel 110, the lens array 120, the second display panel 130, the backlight unit 140, 160, the first optical film 170 and the second optical film 180.

The first optical film 170 is disposed between the second display panel 130 and the backlight unit 140, 160 and reflects light reflected from the backlight unit 140, 160 again.

The second optical film 180 is disposed between the lens array 120 and the second display panel 130 and reflects light reflected from the backlight unit 140, 160 again.

That is, the first optical film 170 and the second optical film 180 may be disposed in a back side direction and a front side direction of the second display panel 130. Herein, various optical films such as diffuser, prism, and DBEF, especially DBEF may be used for the first optical film 170 and the second optical film 180.

For example, DBEF-H (horizontal) may be used for the first optical film 170 and DBEF-V (vertical) may be used for the second optical film 180.

Accordingly, brightness degradation which may occur as two panels are used can be prevented.

In the above exemplary embodiment, non-emissive display element such as LCD has been explained, but the technical feature of the present invention may be applied to a self-illuminating display element such as Organic Light Emitting Diode (OLED) and Field Emitting Diode (FED).

As described above, according to the present invention, image quality deterioration may be prevented not only in a 3D image but also in a 2D image.

In addition, a 3D image may be realized at every angle as a user's viewing angle is detected.

In a conventional auto-stereoscopic space division 3D method, a left eye image and a right eye image are displayed on a single screen simultaneously and thus, resolution is decreased by half. However, according to the present inventive concept, an image is realized according to a time sharing 3D method just like a shutter glasses method which is currently used for mass production. Thus, resolution may be maintained when an auto-stereoscopic 3D is operated.

Although a few exemplary embodiments of the present invention have been shown and described, it will be appreciated by those skilled in the art that changes may be made in the exemplary embodiments without departing from the principles and spirit of the invention, the scope of which is defined in the claims and their equivalents.

What is claimed is:

1. A 3D image display apparatus, comprising:
   a first display panel which alternately displays a left eye image and a right eye image;
   a second display panel which comprises a plurality of pixels including a left eye pixel and a right eye pixel;
   a backlight unit which is disposed at a back side of the second display panel;
   a lens array which is disposed at a front side of the second display panel and comprises a plurality of lenticular lenses dividing light emitted from the backlight unit into a left eye visual field and a right eye visual field and emitting the divided light; and
   a control unit which controls turning on and off of the left eye pixel and the right eye pixel, constituting the second display panel, based on when the left eye image and the right eye image are displayed;
   wherein the control unit receives a sync signal, corresponding to the left eye image and the right eye image, from the first display panel and controls turning on and off of the left eye pixel and the right eye pixel, constituting the second display panel, according to the sync signal provided from the first display panel.

2. The apparatus as claimed in claim 1, wherein the control unit realizes a 3D image by controlling the left eye pixel and the right eye pixel to be turned on and off alternately so that light emitted from the backlight unit is provided to the lens array when the left eye pixel or the right eye pixel is turned on.

3. The apparatus as claimed in claim 1, wherein the control unit realizes a 2D image by controlling the left eye pixel and the right eye pixel to be turned on and off simultaneously so that light emitted from the backlight unit is provided to the lens array when the left eye pixel and the right eye pixel are turned on.

4. The apparatus as claimed in claim 1, wherein the first display panel comprises a color liquid crystal, and
   wherein the second display panel comprises a black and white liquid crystal.

5. The apparatus as claimed in claim 1, further comprising a sensing unit which senses a user's location,
   wherein the control unit changes the left eye pixel and the right eye pixel according to the user's location.

6. The apparatus as claimed in claim 1, further comprising at least one of a first optical film which is disposed in a back side direction of the second display panel and a second optical film disposed in a front side direction of the second display panel.

7. A method for driving a 3D image display apparatus including a first display panel, a second display panel which comprises a plurality of pixels including a left eye pixel and a right eye pixel, a backlight unit which is disposed in a back side of the second display panel, a lens array which is disposed in a front side of the second display panel and comprises a plurality of lenticular lenses dividing light emitted from the backlight unit into a left eye visual field and a right eye visual field and emitting the divided light, the method comprising:
- alternately displaying a left eye image and a right eye image; and
- controlling turning on and off of the left eye pixel and the right eye pixel, constituting the second display panel, based on when the left eye image and the right eye image are displayed;
- wherein the controlling comprises receiving a sync signal, corresponding to the left eye image and the right eye image, from the first display panel and controlling turning on and off of the left eye pixel and the right eye pixel, constituting the second display panel, according to a sync signal provided from the first display panel.

8. The method as claimed in claim 7, wherein the controlling comprises realizing a 3D image by controlling the left eye pixel and the right eye pixel to be turned on and off alternately so that light emitted from the backlight unit is provided to the lens array when the left eye pixel or the right eye pixel is turned on.

9. The method as claimed in claim 7, wherein the controlling comprises realizing a 2D image by controlling the left eye pixel and the right eye pixel to be turned on and off simultaneously so that light emitted from the backlight unit is provided to the lens array when the left eye pixel and the right eye pixel are turned on.

10. The method as claimed in claim 7, wherein the first display panel comprises a color liquid crystal and the second display panel comprises a black and white liquid crystal.

11. The method as claimed in claim 7, further comprising:
- sensing a user's location; and
- changing the left eye pixel and the right eye pixel according to the user's location.

12. The method as claimed in claim 7, wherein the displaying comprises displaying with the 3D image display apparatus which further comprises at least one of a first optical film which is disposed in a back side direction of the second display panel and a second optical film disposed in a front side direction of the second display panel.

\* \* \* \* \*